United States Patent [19]

Peterson

[11] 4,208,889
[45] Jun. 24, 1980

[54] CONSTANT VELOCITY, TORSIONALLY RIGID, FLEXIBLE COUPLING

[75] Inventor: Robert R. Peterson, Hudson, Mass.

[73] Assignee: Barry Wright Corporation, Watertown, Mass.

[21] Appl. No.: 937,919

[22] Filed: Aug. 30, 1978

[51] Int. Cl.² ............................................. F16D 3/48
[52] U.S. Cl. ............................................. 64/10; 64/8; 64/27 NM; 64/11 F
[58] Field of Search ............... 64/10, 8, 27 NM, 11 R, 64/11 F, 21, 27 R

[56] References Cited

U.S. PATENT DOCUMENTS

| 2,485,893 | 10/1949 | Kost | 64/20 |
| 2,593,877 | 4/1952 | Hagenlochgr | 64/27 R |
| 2,727,369 | 12/1955 | Fawick | 64/10 |
| 2,995,907 | 8/1961 | Orain | 64/11 R |
| 3,257,826 | 6/1966 | Peterson | 64/14 |
| 3,304,743 | 2/1967 | Paulsen | 64/21 |
| 3,477,246 | 11/1969 | Martin | 64/11 R |

FOREIGN PATENT DOCUMENTS 316030 7/1929 United Kingdom .................. 64/10

*Primary Examiner*—Ira S. Lazarus
*Assistant Examiner*—Magdalen Moy
*Attorney, Agent, or Firm*—Milton E. Gilbert

[57] ABSTRACT

A flexible coupling comprises first and second torque transmitting members capable of being rotated about first and second axes, respectively. The coupling also includes connecting members associated in pairs. The connecting members are connected together and to the torque transmitting members through suitable bearings, preferably of the elastomeric type, for carrying pure compressive stress loading for torque transmission and for providing shear motion and restoring forces when said axes become misaligned.

24 Claims, 11 Drawing Figures

CONSTANT VELOCITY, TORSIONALLY RIGID, FLEXIBLE COUPLING

The present invention relates generally to mechanical couplings and more particularly to flexible couplings capable of transmitting a relatively large torque at high speeds and constant velocities from a driving member to a driven member.

Flexible couplings are well known and are useful for a variety of purposes where it is desirable to transmit rotational energy from a driving member to a driven member. For example, in my U.S. Pat. No. 3,257,826, I describe such a coupling. The prior art coupling includes a like plurality of fingers associated with each of the driving and driven members, with each member including two or more fingers. The fingers associated with each member extend toward the other member, each along an axis substantially parallel to the center rotation axis of the member so that the fingers of each member are circumferentially spaced from one another about the rotation axes. The coupling also comprises elastomeric joint members for connecting a finger of one member to a finger of the other member. Each elastomeric joint member includes (1) a first body of a bonded laminate having a spherical convex-concave contour opposed and transverse to the driving torque and comprising alternate layers of an elastomeric resilient material and a nonextensible material, (2) a second body of a bonded laminate having a cylindrical convex-concave contour also opposed and transverse to the driving torque and comprising alternate layers of an elastomeric resilient material and a nonextensible material and (3) a floating member disposed between and secured to the two bodies.

The spherical and cylindrical bodies of each joint member are secured to opposite sides of the floating member so that (1) the center of curvature of the spherical body lies on the center axis of curvature of the cylindrical body and (2) the two bodies are "circumferentially" displaced from one another about the rotation axes. This particular design, however, has proven to be unsatisfactory. As will be more evident hereinafter, when the coupling is rotating and subject to misalignment between the driving and driven members, each joint member is subjected to "angular" and "translational" motions (motions to be described in greater detail with respect to FIGS. 1-3). It has been found that when such conditions occur, one side of the floating member, attached to the cylindrical body, and the other side of the floating member attached to the spherical body, do not move (in an angular and translational sense) simultaneously due to the circumferential spacing provided between them by the floating member itself. This will result in severe cocking, compressive forces being placed on the cylindrical body while the body is under a compressive load when such angular and translational motions occur. Theoretically this problem can be overcome by making the cylindrical body infinitesimally thin so that the surfaces attached to opposite sides of the cylindrical body move simultaneously. However, making the cylindrical body infinitesimally thin, reduces or eliminates the ability of the body to accommodate motions from misalignment as the shear strains, by definition, would be infinitely large.

It is therefore a general object of the present invention to provide an improved torsionally rigid flexible coupling capable of transmitting relatively high torque from a driving member to a driven member at constant velocities regardless of misalignment between said members.

Another object of the invention is to provide an improved flexible coupling capable of transmitting relatively high torque from a driving member to a driven member at high speeds and at constant velocities regardless of misalignment between said members.

Another object of the invention is to provide an improved flexible coupling comprising bearings which are designed and located to provide pure compressive loading for torque transmission and pure shear motion for accommodation of motions resulting from misalignment.

And another object of the present invention is to provide an improved flexible coupling comprising elastomeric bearings which are designed and located to carry purely compressive loads for torque transmission and provide restoring forces from shear motion when the driving and driven members become misaligned.

And still another object of the present invention is to provide an improvement over the coupling member described in my U.S. Pat. No. 3,257,826.

And yet another object of the present invention is to provide an improved flexible coupling for connecting two rotatable shafts in which the range of subcritical and supercritical speeds respectively below and above the first whirl speed mode of the shafts can be predetermined and thereby adjusted as the particular application requires.

These and other objects of the present invention are achieved by a high-speed, constant velocity, torsionally rigid, flexible coupling comprising first and second torque transmitting members capable of being rotated about first and second rotation axes, respectively. The coupling also comprises connecting means for connecting the first and second torque transmitting members. The connecting means comprises a plurality of connection members associated together in pairs. The connection members of each pair are oriented so that adjacent ends are secured together through suitable spherical bearing means, preferably of an elastomeric type, so as to carry compressive loads resulting from driving torque applied to one of the torque transmitting members, and to provide shear motion and restoring forces between the connecting members in response to al angular motion when the torque transmitting members become angularly or axially misaligned. The opposite ends of the connecting members are suitably connected to the corresonding torque transmitting members through bearing means, also preferably of an elastomeric type, axially displaced from and thus in phase with the spherical bearing means, for carrying compressive loads resulting from driving torque applied to one of the torque transmitting members and providing shear motion and restoring forces between the connecting member and the torque transmitting member in response to all translational motion when said torque transmitting members are angularly or axially misaligned.

Other features and many attendant advantages of the invention are disclosed in or rendered obvious by the following detailed description taken in connection with the accompanying drawing wherein.

In the drawings, the same numerals are used to refer to like parts.

Figure 1A:
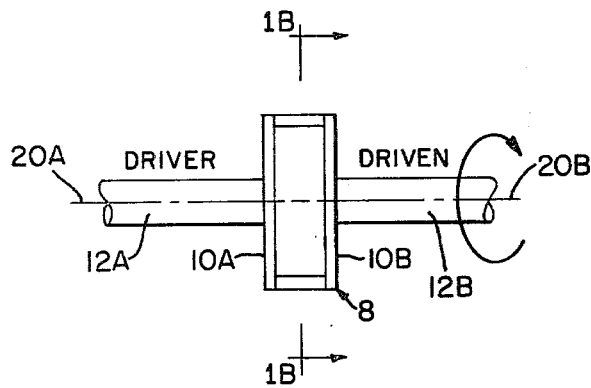
FIGS. 1-3 illustrate the kinetics of a flexible shaft coupling subjected to misalignment with FIGS. 1A, 2A and 3A showing side elevational schematic views and FIGS. 1B, 2B and 3B showing schematic cross-sectional views taken through the coupling.
Figure 1B:
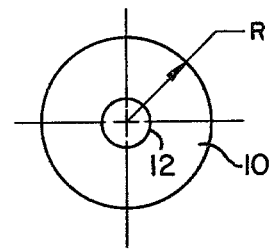

The kinetics of a flexible shaft coupling of the type disclosed and claimed in my U.S. Pat. No. 3,257,826, are shown in FIGS. 1–3. Generally, the coupling 8 in FIG. 1A connects two shafts 12, together. For purposes herein, shaft 12A is designated the driver or driving shaft to which the driving torque is applied and shaft 12B is designated the driven shaft to which the torque is transmitted from the driving shaft 12A, through coupling 8. The coupling 8 includes torque transmitting members 10A and 10B, in the form of flanges, connected to shafts 12A and 12B, respectively and the shafts rotate about axes 20A and 20B, which are shown aligned.

Figure 2A:
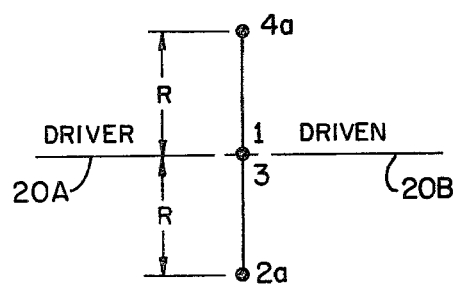
Figure 2B:
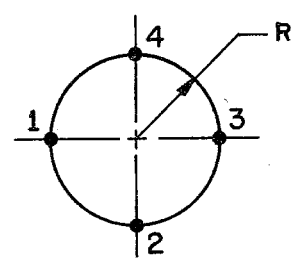

FIGS. 2A and 2B schematically show the system of FIG. 1 with a point on either one of the members 10 rotating through, and in a plane defined by, four points 1, 2a, 3 and 4a denoted at 90 degree intervals at a constant radius R, when the rotation axes of shafts 12 are aligned.

Figure 3A:
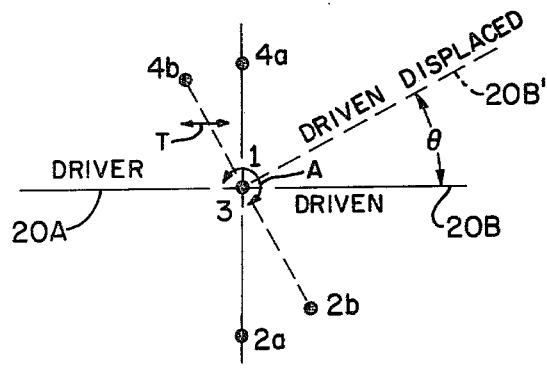
Figure 3B:
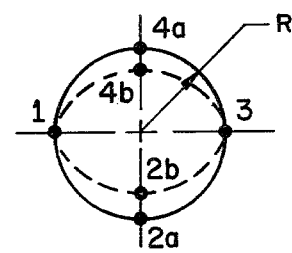

FIGS. 3A and 3B, show schematically and exaggerated for purposes of illustration, the system of FIG. 1, when an angular misalignment $\theta$ is imposed on the driven shaft. Rotation of the driven shaft about axis 20B' (axis 20B displaced by angle $\theta$) produces a motion of the same point of the flange through, and in a plane defined by, four points 1, 2b, 3 and 4b. When such misalignment occurs, the component of motion of the point of the flange occurring in the direction of the originally aligned axes 20A and 20B toward or away from the points 2a and 4a (indicated by arrow T in FIG. 3A), which occurs when the point moves through the plane defined by points 1, 2b, 3 and 4b, is termed herein "translational motion". It will also be appreciated that the point also experiences "angular" motion, with the motion at points 1 and 3 being purely angular (as shown by arrows A), since the angular motion occurs about the axis defined by points 1 and 3. Thus, any motion occurring between point 1 and 2b, 2b and 3, 3 and 4b, and 4b and 1, will be a result of both translational and angular motion with maximum translational motion (and no angular motion) occurring at points 2b and 4b and maximum angular motion (and no translational motion) occurring at points 1 and 3. The coupling 8 located between the driver and driven members 10 must, therefore, be designed to accommodate all combinations of angular and translational motion.

In the design of the coupling described in my U.S. Pat. No. 3,257,826, the cylindrical bearing attached to one end of each floating member is circumferentially spaced about axes 20A and 20B from the spherical bearing attached to the other end of the floating member. As a result, maximum angular and translational motions of the respective points 1 and 3 and points 2b and 4b will not occur simultaneously for the cylindrical and spherical bearings of each. Specifically, when, for example, a spherical bearing is located at point 4b, and subjected to maximum translational motion, the corresponding cylindrical bearing, being circumferentially spaced therefrom, will be between, either points 4b and point 1 or point 4b and point 3 so as to be out of phase and thus subjected to both angular and translational motion. This will result in failure of the bearing by subjecting the cylindrical section to cocking-compressive loads since the translational and rotational motions do not occur simultaneously.

In accordance with the principles of the present invention the coupling is redesigned so that each cylindrical bearing or its equivalent is relocated so that it is not circumferentially spaced from the spherical bearing, but is instead axially spaced (in the a direction parallel to axes 20A and 20B) therefrom. Thus, when angular misalignment occurs the spherical bearing is located for example, at point 4b, the cylindrical bearing, or its equivalent, will likewise be located axially from point 4b so that the bearings are in phase with one another whereby the spherical bearing will provide shear relief to all angular motion and the cylindrical bearing will provide shear relief to all translational motion.

Figure 4:
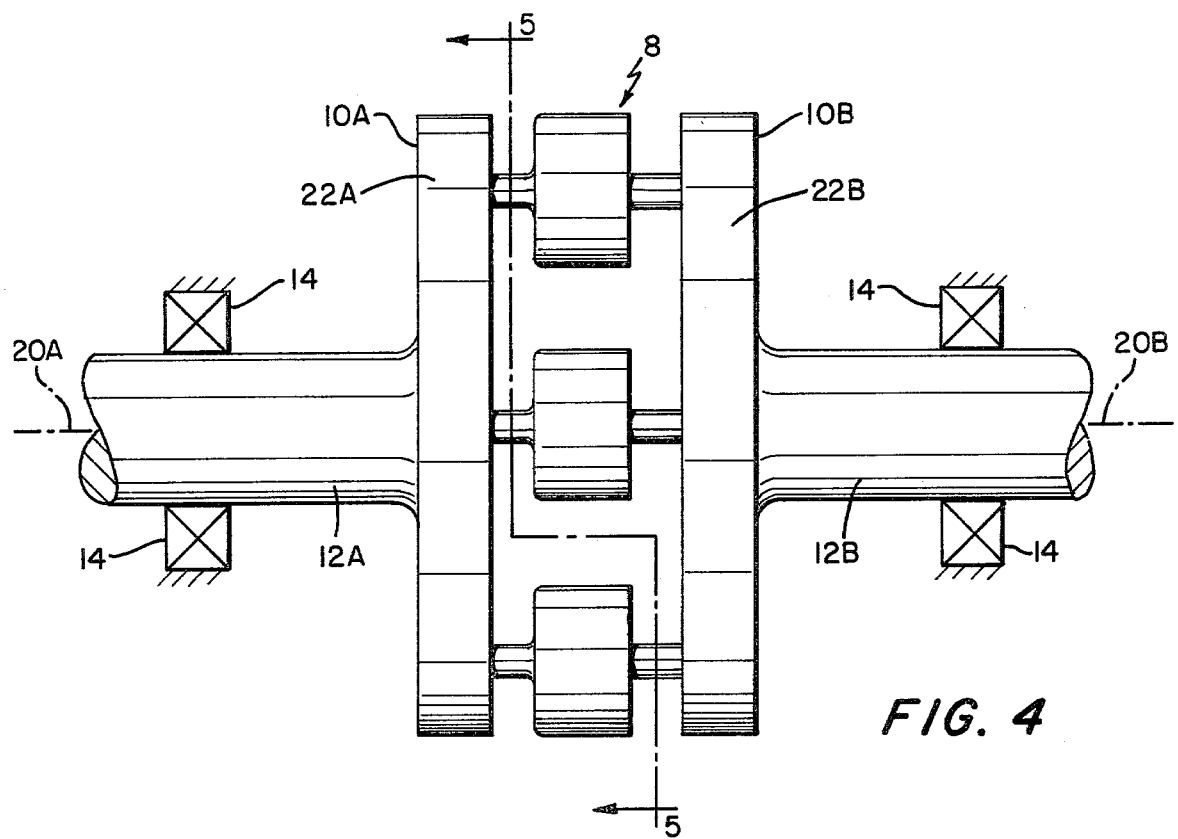
FIG. 4 is a longitudinal elevational view of one embodiment of the present invention.
Figure 5:
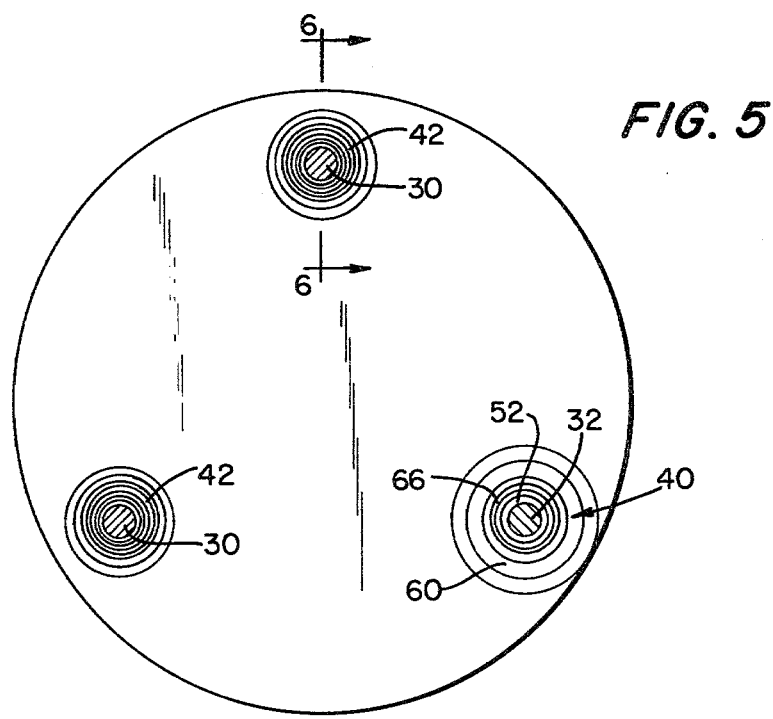
FIG. 5 is a cross-sectional view taken along line 5—5 of FIG. 4.
Figure 6:
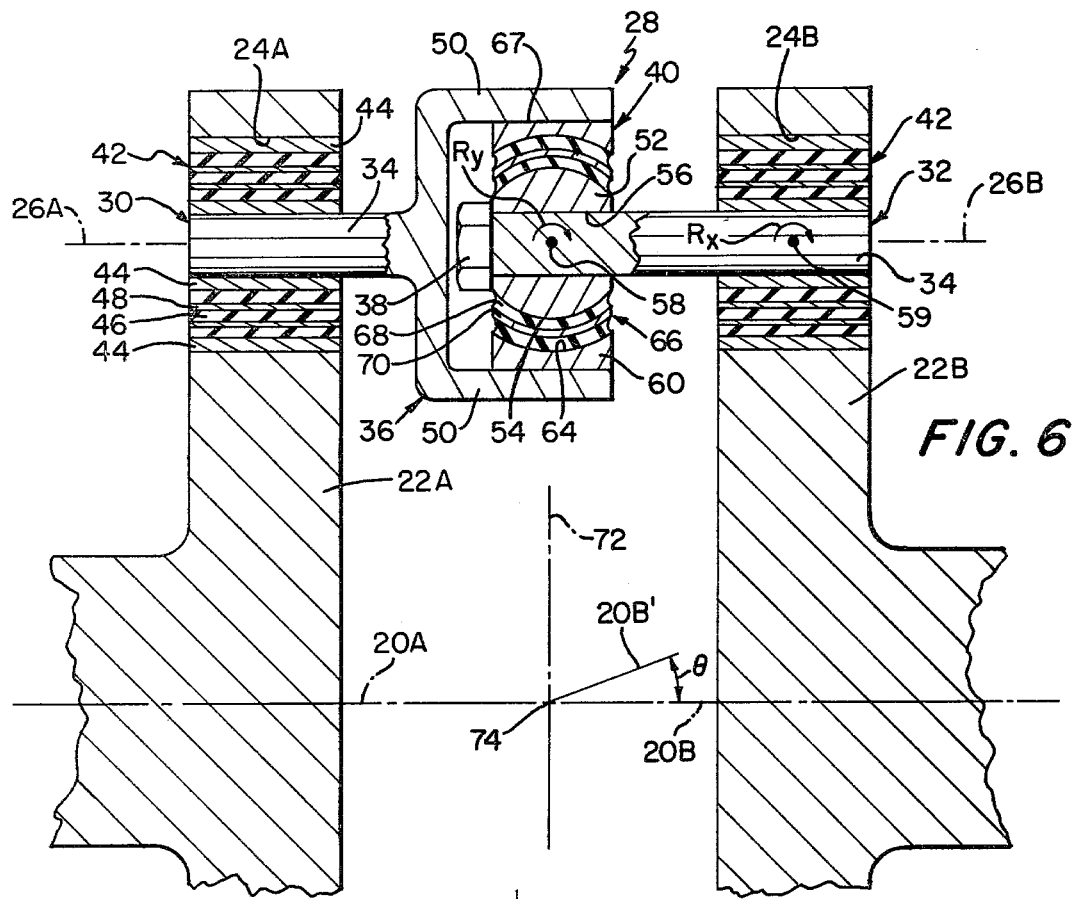
FIG. 6 is a partial longitudinal sectional view taken along line 6—6 of FIG. 5.

Referring to FIGS. 4–6, a coupling designed in accordance with the present invention generally includes two torque transmitting members 10A and 10B. Members 10, for example, include sleeve members adapted to slide on and be affixed to the two shafts 12A and 12B, respectively, or alternatively they may be integrally formed with the respective shafts 12 as shown in FIGS. 4 and 6. In either event, both members are mounted so as to be axially, as well as radially secured by bearings 14, as for example, by securing the inner races of the respective bearings to the shafts with suitable locking screws (not shown). Both shafts 12A and 12B and thus members 10A and 10B are rotatable within their respective bearings 14 about rotation axes 20A and 20B, respectively, which are aligned with the center axes of the shafts 12 and with each other under normal static conditions. In this regard the shafts can be rotated in either direction.

Each member 10 includes a radial extension or flange 22 having its center of mass along the rotation axis of the corresponding member. As shown in FIGS. 4–6 the extension may, for example, be in the form of a disc-shaped flange coaxial with the rotation axis of the corresponding member. Each extension 22 includes two or more apertures 24 having center axes 26 with each of the members including a like number of apertures. The center axis of the apertures associated with each member 10 extend parallel to and are radially-spaced equidistant from the corresponding rotation axis 20 of the respective member. Further, each center axis 26 is preferably equiangularly spaced around the corresponding rotation axis. Thus, where two apertures are provided in each extension 22, they will be equidistant from the rotation axis of the corresponding member and preferably displaced 180° from one another around the rotation axis 20. Similarly, where three apertures are provided as shown in FIG. 5, they will be equidistant from the rotation axis of the corresponding member and preferably displaced 120° from one another around the rotation axis 14, and so forth.

Connection means, generally referred to at 28, connect members 10 so as to (1) tend to maintain the axes 20 aligned with one another and (2) maintain the driven member 10B at a constant angular velocity about axis 20B when the driving member 10A is rotating at a constant angular velocity about axis 20A, whether the axes are aligned or misaligned.

The connection means 28 preferably comprises a first plurality of connecting members 30, one for each aperture 24A of extension 22A and a second like plurality of connecting members 32, one for each aperture 24B of extension 22B. Each connecting member 30 and 32 includes an elongated portion 34 at one end. The members 30 and 32 are secured at their other ends with an arrangement wherein the other end of each member 30 forms a yoke 36 and the other end of each member 32 forms a hexed-shaped head 38, the latter forming part of the bearing unit 40. The elongated portion 34 of each connecting member 30 and 32 is preferably shaped as a cylindrical rod and is mounted in a corresponding one of the apertures 24 of extensions 22 so that the axis of elongation of the portion 34 is aligned with the corresponding center axis 26 of the aperture 22. Each elongated portion 34 is secured in the respective aperture with suitable bearing means 42 for carrying pure compression stress loading between the elongated portion 34 and the extension 22 of the corresponding member when torque is transmitted through the coupling. Bearing means 42 preferably is the type generally referred to as an "elastomeric bearing" which includes the outer and inner sleeves 44, and alternate layers 46 and 48, respectively, of a resilient or elastomeric material, such as rubber or certain plastics, and a nonextensible material, such as metal, with the outermost and innermost layers being made of the resilient material. The size, thickness and number of layers of each cylindrical bearing and the durometer of the elastomeric material depends upon the particular compression loads to be expected. By utilizing elastomeric bearings, undesirable vibration can be at least partially dampened and noise, as well as vibration-reduced wear and stress reduced. Further, due to the resiliency of the elastomeric material, the bearing means 42 provides counteracting restoring forces to shearing forces. Preferably, each bearing means 42 is a cylindrical bearing, coaxially mounted with respect to the center axis 26 of the aperture 24 and the elongate axis of elongated portion 34 of the particular connecting member 30 or 32 to which the outer and innermost elastomeric layers of the cylindrical bearing are respectively bonded to the outer and inner sleeves 44. The latter, in turn, can be bonded or otherwise secured respectively, to the inner surface of the aperture 24 and to the elongated portion 34 of each connecting member so that the bearing not only carries pure radial compressive loading resulting from torque transmission but also provides counteracting restoring forces to shearing forces applied parallel to axis 26 resulting from translational motion when the members 10 are misaligned.

The yoke 36 of each member 30 may be in the form of a cylindrical cup 50 such as shown in FIG. 4 or of a conventional type having two or more arms integrally formed as part of the connecting member 30 and receiving the bearing unit 40.

Each bearing unit 40 includes an inner frusto-spherical inner race 52 having an outer convex frusto-spherical surface 54 and inner cylindrical bore 56 for receiving the connecting member 32. The inner race 52 is fixedly secured to the connecting member 32 in any well known manner such as securing the two together with a bonding cement so that the outer surface 54 of the race 52 has its center of curvature, (at point 58) on, as well as an axis of revolution aligned with, the axis of the elongated portion of the connecting member 32.

The bearing unit 40 also includes an outer race 60 and spherical bearing means 66. Outer race 60 has an outer surface or surfaces 67 fixedly secured to the cup 50 of yoke 36 by any known means such as with a bonding cement, and an inner concave frusto-spherical surface 64 having its center of curvature at point 58 and an axis of revolution aligned with the elongated axis of the elongated portion of member 32. Spherical bearing means 66 is suitably provided between and fixedly connects the outer surface 54 of the inner race 52 and the inner surface 64 of the outer race 60, so that the inner and outer races 52 and 60 and bearing means 66 form a compact bearing unit. Spherical bearing means 66 (1) carries compressive loads between the outer surface 54 of inner race 52 and inner surface 64 of the outer race 60 resulting from torque transmission from driving member 10A to driven member 10B, and (2) provides shear motion and restoring forces between the outer and inner surfaces 54 and 64 when the axes 20A and 20B are angularly misaligned and the connecting members are subjected to angular motion resulting from such misalignment wherein the inner race 52 pivots about point 58 with respect to the outer race 60.

Each spherical bearing means 66 preferably is also of an elastomeric bearing type having alternate layers 68 and 70 of a resilient elastomeric material and nonextensible material with the outer and inner most layers being of the former type and bonded, respectively, to the inner surface 64 of the outer race 60 and outer surface 54 of inner race 52.

The spherical bearing unit 66 of each set of connecting members 30 and 32 is positioned so that the center of curvature at point 58 of each set all lie in the same plane (indicated in FIG. 6 at 72 with the plane extending perpendicular to the sheet of drawing). This plane extends normal to the rotation axes 20A and 20B of members 10A and 10B, respectively, when the axes are aligned. The plane 72 is further positioned so as to bisect the intersecting point 74 of axes 20A and 20B should the latter become angularly misaligned. Thus, torque applied to the driving member 10A to rotate the latter at a constant velocity, will be transmitted through the connecting means 28 so as to rotate the driven member 10B also at a constant velocity regardless of whether the axes 20A and 20B are aligned or misaligned. So long as members 10 remain aligned the bearing means 42 and spherical bearing means 66 carry pure compressive loads resulting from torque transmission through the coupling. As shown in FIG. 6, when one of the members 10A and 10B rotate so that the respective rotation axis 20B' becomes angularly misaligned with the other at an angle θ, the point of intersection 74 will always lie in plane 72 with bearing means 42 and spherical bearing means 66 providing at least limited shearing relief and providing restoring forces to realign the two axes 20.

More specifically, when angular misalignment occurs, the portion of the connecting member which extends through bearing means 42 will move along the respective center axis 26B in a back and forth oscillatory translational motion with each revolution of the extension members. This oscillatory translational motion produces shearing forces between each connecting member 32 and the corresponding bearing means 42. Even though the latter is bonded to the former by the inner sleeve 44, due to the elastomeric properties of the elastomeric layers 46 of bearing means 42, some give will be provided to accommodate these shearing forces. Similarly, angular misalignment causes the inner race 52 of the spherical bearing means 40 to pivot in a angular or pivotal oscillatory motion with respect to the outer race 60 of the spherical bearing means 66 wherein the pivot point 58 will remain in the plane 72 through each revolution of the coupling. This pivoting angular motion results in pure shear between the outer surface 54 of the inner race 62 and spherical bearing 66, and between the spherical bearing 66 and the inner surface 64 of the outer race 60. Even though the bearing 66 is bonded to both the inner and outer race, due to the give provided by the elastomeric layers of the bearing 66, sufficient relief is provided. It should be appreciated that since the bearing means 42 and spherical bearing means 66 of each pair of connecting members are located about the axes 20A and 20B at the same circumferential position, as the coupling rotates and misalignment occurs the pivoting and translational motion through which the connecting members move occur simultaneously so that relief to all angular movement occurs between the inner and outer races 52 and 60 and relief to all translational movement occurs between connecting members 30 and 32 and the bearing means 42.

In a similar manner it will be appreciated that when one or both of the torque transmitting members 10 becomes axially misaligned, i.e. axially shifts along its axis 20, that similar angular and translational motions occur with the bearing means 42 and 66 acting to restore the torque transmitting members to their original aligned position.

Preferably, the cylindrical bearing means 42 is provided with a rotational spring rate (defining the ability of the connecting member 32 or 34 to rotate about the center point 59 about the axis 26 as indicated by arrow Ry in response to a force applied perpendicular to the axis 26 at a distance from point 59) 1000 to 2000 times stiffer than the rotational spring rate of the spherical bearing means 66 (defining the ability of the inner race 52 to rotate relative to the outer race 60 about point 58). This relatively greater spring rate of cylindrical bearing means 42 means that the latter is virtually rigid in all directions except along axis 26. As such substantially all angular motion occurs about the point 58 with little occurring about point 59, particularly when the members 10 become axially misaligned. Further, no cocking (pivoting about points 58 and 59) will occur purely from torque forces. It should be appreciated that one can control the amount of both angular and translational motion resulting from shear by varying the physical characteristics of the bearing means 42 and 66, i.e. by varying the length of the bearings, the thickness of the layers of the bearings, the number of layers of each bearing, the durometer of the elastomeric layers, etc.

Figure 7:
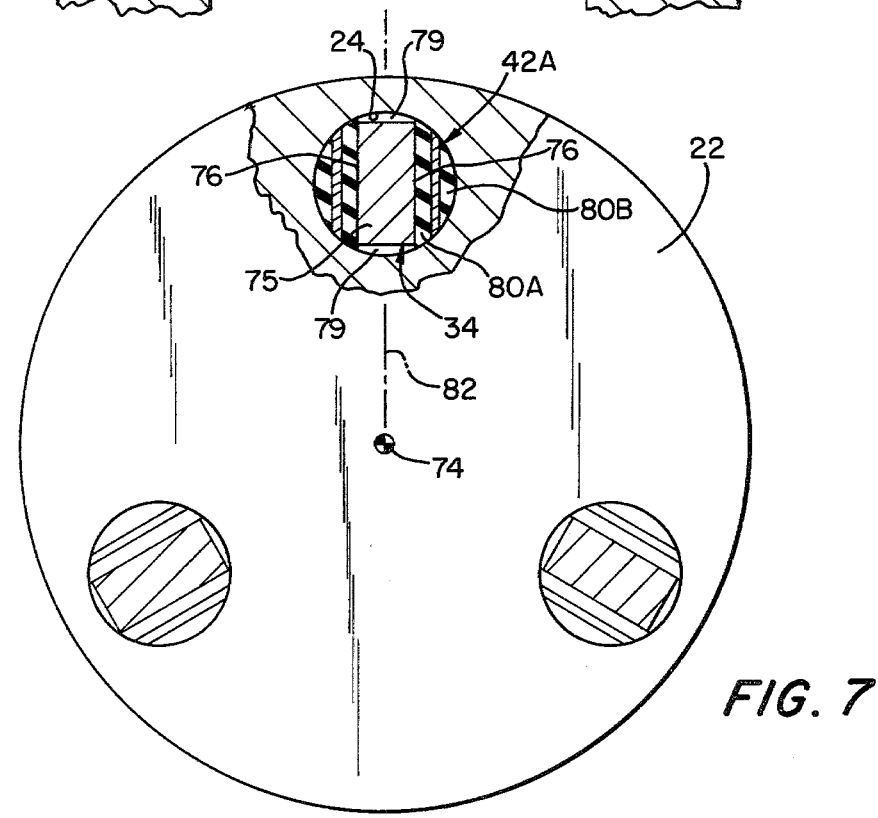
FIG. 7 is a cross-sectional view similar to the view shown in FIG. 5 and further partially cut-away, illustrating a modification of the present invention.

Although the bearing means 42 are preferably cylindrical elastomeric bearings, it will be appreciated that other bearings can be utilized. For example, as shown in FIG. 7, at least the part 75 of the elongated portion 34 of each connecting member extending into the aperture 24 is modified so as to be substantially rectangular in cross-section having a center plane 82 parallel to and equidistant from its sides 76 and a width and height so that the part 75 extends through the aperture 24 with clearance as shown by gaps 79. Part 75 of each elongated portion is secured to extension 22 with flat-rectangular shaped elastomeric bearings 42A. Each bearing 42A includes alternating layers of an elastomeric material and nonextensible material, with the innermost and outermost layers 80A and 80B, respectively, made of the elastomeric material and all the layers being in planes substantially parallel to center plane 82. The innermost layer 80A is bonded to a side 76 of part 75 of the elongated portion of the connecting member while the outermost layer 80B is either shaped or compressed in order to conform and be bonded to the inner surface of the aperture 24. By orienting each connecting member and each of the layers of each bearing 42A so that the center plane 82 of each part 74 extends through and includes (1) rotation axis 20 of the particular member 10 to which it is secured and (2) the center axis 26 of the aperture 24, a maximum amount of the compressive stress load, provided between the part 75 and extension 22 when a driving torque is applied to the driving member, will be carried by the elastomeric bearings. Further, the gaps 79 allow the part 75 of the connecting member to give in a radial direction with respect to rotation axis 26. With the arrangement shown relief to shear along the axial direction is provided between the sides 76 of part 75 on the one hand and the inner surfaces of the corresponding aperture 24 of extension 22 on the other hand.

Figure 8:
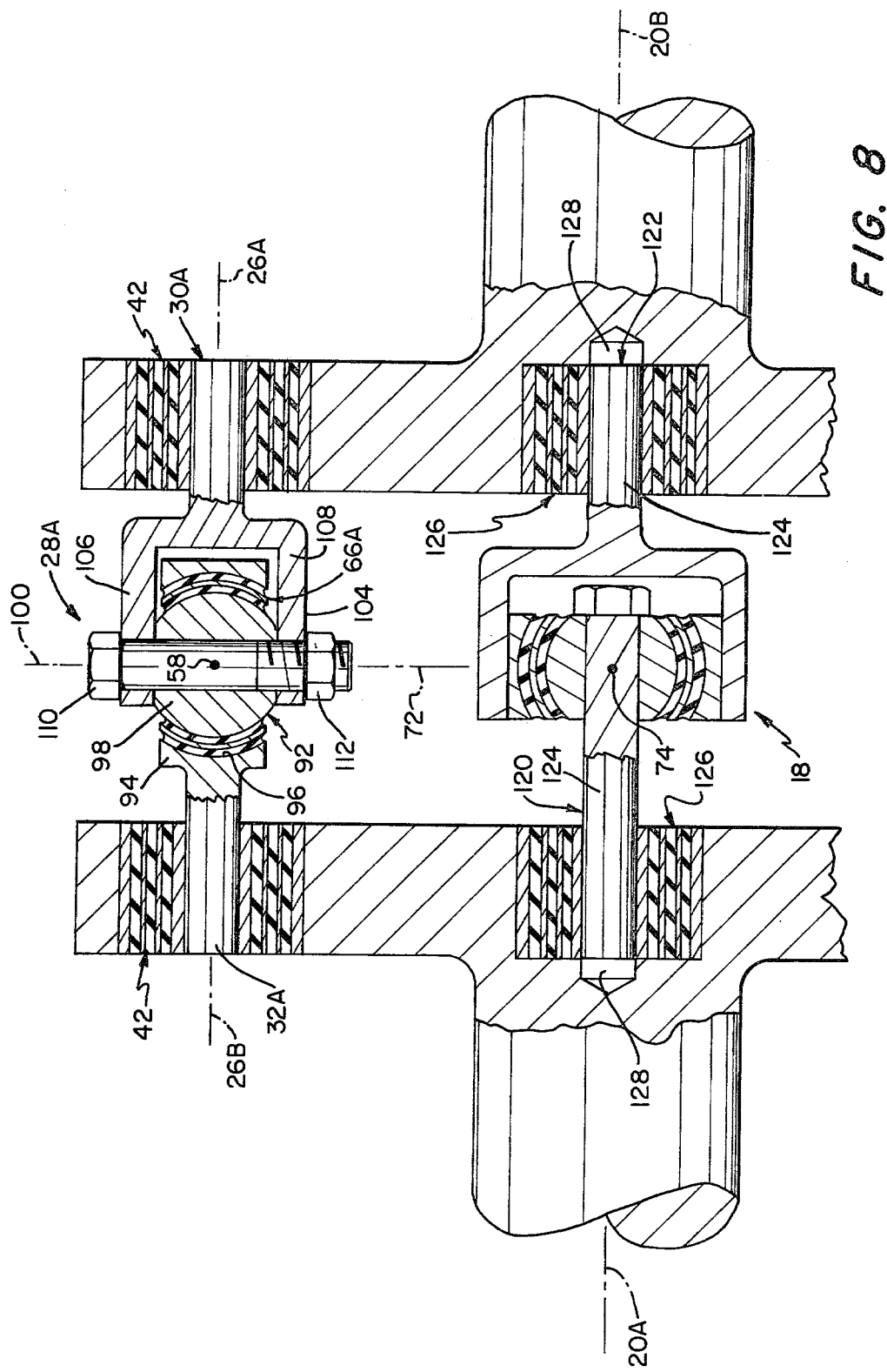
FIG. 8 is a side view, partially in section, illustrating other modifications of the present invention.

Referring to FIG. 8, as a further modification to the embodiment shown in FIGS. 4-6, the connecting members 30A and 32A are the same as members 30 and 32 except that the connection means 28A is modified from the arrangement shown in FIGS. 4-6. Specifically, the connection means 28A includes elastomeric bearing unit 92, the latter being substituted for the bearing unit 40, at the end of connecting member 32A. Unit 92 includes a cylindrical outer race 94 preferably integrally formed with the remaining portion of connecting member 32A, the latter extending radially away from the former. The opening of cylindrical race 94 is defined by the concave frusto-spherically curved surface 96 having a center of curvature at the point 58 along the axes 26A and 26B and an axis of revolution 100 which extends in plane 72. Secured to surface 96 is spherical bearing means 66A preferably an elastomeric bearing, comprising alternating layers of elastomeric material and nonextensible material. Like bearing means 66 of FIGS. 4-6, each layer of spherical bearing means 66A has its center of curvature at 58. The innermost elastomeric layer of bearing means 66A is bonded to the spherically curved outer surface of an inner race 98 having a cylindrical bore coaxial with the axis 100, and extending through the plane 72. The laminated bearing counteraction provided by the spherical bearing means 66A accommodates compressive loads resulting from a driving torque being transmitted through the coupling and provides shear relief and restoring forces to all angular motion resulting from misalignment.

The connection means 28A also includes a conventional clevis 104 which is substituted for the yoke 36 and preferably integrally formed as part of connecting member 30A. The clevis suitably attached to bearing unit 92; wherein the two arms 106 and 108 of clevis 104 are provided with aligned openings which are aligned with axis 100 so that a bolt 110 can be extended through the openings of arms 106 and 108 maintaining the openings of the clevis arms 106 and 108 concentric with axis 100. A nut 112 coacts with bolt 110 to clamp the clevis to the inner bearing race 98 of the bearing unit 92.

The axis 100 of each connection means 28A extends radially in the plane 72 bisecting the intersecting point 74 of axes 20 should the latter become angularly misaligned.

The above-described coupling together with its modifications are useful in transmitting high torques from a driving member to a driven member at constant velocities regardless of any angular or axial misalignment arising from the rotation of the two members. As well known the shafts 12, to which members 10 form a part or are attached, rotate through whirl modes as the speed of the shafts increase. At each of these modes the rotation of the shafts are said to be operating at critical speeds, and at such speeds undesirable resonances can result.

In accordance with the present invention, the speeds at which the whirl speed modes occur and in particular the range of subcritical and supercritical operation can be adjusted, i.e., either increased or decreased, by merely changing the radial compressive spring rate of each of the bearing means 42, 42A, 66 and 66A, by, for example, varying the durometer of the elastomeric layers of each of the bearings. In this manner, the coupling can be "tuned" to exhibit the whirl speed modes at predetermined speeds.

Alternatively, the first whirl speed mode can be changed by modifying the geometry of the coupling as shown in FIG. 8. More specifically, the means for modifying the angular speed at which the first whirl mode occurs is generally referred to at 118 and comprises two additional connecting members 120 and 122, formed in an identical manner to either the connecting members 30A and 32A of FIG. 8 or preferably to the members 30 and 32 of FIG. 6 as illustrated in FIG. 8. Each of the connecting members 120 and 122 includes end portion 124 secured within and bonded to an elastomeric bearing means 124 preferably of the type and in the same manner as described with respect to bearings 42 of FIGS. 4-6. The bearing means 124 is in turn mounted within and bonded to a bore 126 formed in members 10 so that the elongate axes of the elongate portions of members 120 and 122 are aligned with the rotation axes 20A and 20B. A counterbore 128 extends into each member 10 so as to provide relief for the ends of the connecting member when angular or axial misalignment occurs. The ends of members 120 and 122 are formed and connected together in an identical manner as that described with respect to the connecting members 30 and 32 or 30A and 32A. The center of curvature of the bearing unit 130 is located at point 74 where the axes 20 interset when misalignment occurs. It will be appreciated that bearing means 126 as well as the bearing unit 130 provide limited shearing relief and restoring forces when angular misalignment occurs. In addition to increasing the range of subcritical speeds the connection means 118 also provides an additional connection joint between the two torque transmitting members providing a safety measure should one or more of the connection means 28 or 28A fail.

The invention as herein described has many advantages, of which a principal one is the flexible coupling can transmit high torque at a constant velocity from one rotating shaft to another, regardless of whether the shafts are aligned or become misaligned through rotation. Another principal advantage of the flexible coupling results from the design and location of the bearings due to torque transmission while limited shear motion is provided by the bearings due to misalignment. Further, by utilizing elastomeric bearings, undersirable vibrations can be at least partially dampened and noise, as well as vibration-induced wear and stress reduced. These bearings further have a positive restoring force and thus substantially zero backlash. The particular design of the present invention enables the driving shaft to rotate in either direction with equally satisfactory results. By placing the bearing means 42 and 42A in the same circumferential location as the spherical bearing means 66 as the coupling rotates and axes 20A and 20B become misaligned, translational and angular motion occurs simultaneously with respect to these bearing means. Finally, by varying the radial compressive spring rate of the elastomeric bearings and/or by utilizing connecting members 120 and 122, the whirl speed mode speeds can be modified to tune the coupling to exhibit predetermined subcritical and supercritical speed ranges without losing any of the advantages of the present invention. Still other advantages will be obvious to persons skilled in the art.

What is claimed is:

1. A flexible coupling having a central axis of rotation; said coupling comprising:
   first and second torque transmitting members capable of being mounted for rotation about said central axis;
   a plurality of connecting members, each having first and second opposite ends and being associated in pairs for connecting said first torque transmitting member to said second torque transmitting member;
   spherical elastomeric bearing means for connecting the first ends of each pair of said connecting members together; and
   second elastomeric bearing means for connecting the second ends of each pair to said first and second torque transmitting members, respectively, so that each pair of connecting members is radially spaced from said central axis and circumferentially spaced from the other pairs of connecting members; and said spherical elastomeric bearing means and said second elastomeric bearing means associated with each said pair are all circumferentially aligned along a common axes with regard to one another about said central axis;
   wherein said spherical elastomeric bearing means (1) carries compressive loads when torque is applied to one of said torque transmitting members about said central axis, and (2) provides shearing relief and restoring forces responsively to all angular motion when at least one of said torque transmitting members is misaligned from said central axis; and said second elastomeric bearing means (1) carries compressive loads when torque is applied to one of said torque transmitting members about said central axis and (2) provides shearing relief and restoring forces in response to all translational motion when at least one of said torque transmitting members is misaligned from said central axis.

2. A flexible coupling in accordance with claim 1, wherein said first and second torque transmitting members each includes a radial extension having a plurality of apertures, each for receiving the second end of a corresponding one of said first connecting members of each pair.

3. A flexible coupling in accordance with claim 2, wherein each of said second elastomeric bearing means is disposed in a corresponding one of said apertures between the inner surface of said aperture and the second end of the corresponding connecting member.

4. A flexible coupling in accordance with claim 3, wherein the second ends of said connecting members are elongated and are mounted in the respective aperture, so that the elongated axes of said second ends are parallel to said central axis.

5. A flexible coupling in accordance with claim 4, wherein said apertures of each of said torque transmitting members are equiangularly disposed around and equidistant from said central axis.

6. A flexible coupling according to claim 5, wherein said second ends of said connecting members are of a cylindrical cross-section, said apertures are circular and said second elastomeric bearing means includes elastomeric bearings, each cylindrical in cross-section.

7. A flexible coupling according to claim 6, wherein said second elastomeric bearing means each include alternating bonded layers of a resilient material and a nonextensible material with the innermost and outermost layers being made of the resilient material.

8. A flexible coupling according to claim 5, wherein said second ends of said connecting members are of a rectangular cross-section, and said second bearing means includes an elastomeric bearing substantially rectangular in cross-section.

9. A flexible coupling according to claim 8, wherein said second bearing means each includes a pair of elastomeric bearings secured respectively to opposite sides of each of said second ends of each of the connecting members in diametrically opposite positions of the respective aperture, wherein each of said elastomeric bearings comprises alternating bonded layers of a resilient material and a nonextensible material, with the innermost and outermost layers being made of the resilient material.

10. A flexible coupling according to claim 9, wherein the center plane disposed between and parallel to said opposite sides of each of said first ends of said connecting members passes through and includes said central axis.

11. A flexible coupling in accordance with claim 1 wherein said spherical elastomeric bearing means includes a bearing unit connected to the first end of one of the connecting members of each pair and a yoke, supporting said bearing unit, connected to the first end of the other of the connecting members of each pair.

12. A flexible bearing in accordance with claim 11, wherein said bearing unit includes an outer race secured to said yoke, an inner race secured to said one connecting member and spherical elastomeric bearing disposed between said inner and outer races and including an elastomeric bearing comprising alternating bonded layers of a resilient material and a nonextensible material with the innermost and outermost layers being made of the resilient material and respectively bonded to said inner and outer races.

13. A flexible coupling according to claim 1, wherein the first end of one of said connecting members of each pair includes a cylindrical section, said first end of the other connecting member of each pair includes a clevis, and said spherical bearing means includes a bearing unit disposed coaxially within and secured to said cylindrical section, said coupling further including a pivot member for securing said clevis to said bearing unit and having a pivot axis disposed coaxially with said cylindrical section.

14. A flexible coupling according to claim 13, wherein said bearing unit includes a inner race secured by said pivot member and an spherical elastomeric bearing secured between said cylindrical section and said inner race.

15. A flexible coupling according to claim 14, wherein said spherical bearing includes alternating bonded layers of resilient material and nonextensible material wherein the innermost and outermost layers are of said resilient material and bonded respectively to said inner race and said cylindrical section.

16. A flexible coupling in accordance with claim 13, wherein the pivot axis associated with each pair of connecting members extends radially toward said central axis.

17. A flexible coupling in accordance with claim 1, further including means for modifying the rotation speed of said first and second torque transmitting members at which the first whirl mode occurs.

18. A flexible coupling in accordance with claim 17, wherein said last-mentioned means includes a first elongated member having one end secured to said first torque transmitting member so that the elongated axis of said first elongated member is aligned with said central axis, a second elongated member having one end secured to said second torque transmitting member so that the elongated axis of said second elongated member is aligned with said central axis, and means for securing the other ends of said first and second elongated members so that said elongated members pivot with respect to one another about the point of intersection of the rotation axes of said torque transmitting members when said torque transmitting members are angularly misaligned.

19. A flexible coupling in accordance with claim 18, wherein said means for securing comprises spherical bearing means including a spherical elastomeric bearing having a center of curvature at said point of intersection.

20. A coupling according to claim 1, where the rotational spring rate of said second elastomeric bearing means, about a point within said second elastomeric bearing means on said common axis in response to a force applied perpendicular to said common axis and spaced from said point, is substantially stiffer than the rotational spring rate of said spherical elastomeric bearing means about the center of curvature of said spherical bearing means.

21. A coupling according to claim 20, wherein the rotational spring rate of each said second elastomeric bearing means is from 1000 to 2000 times stiffer than the rotational spring rate of said spherical bearing means.

22. A coupling according to claim 1, wherein the physical characteristics of said spherical and second elastomeric bearing means are capable of being modified so as to provide a predetermined amount of motion in response to predetermined shearing forces.

23. A coupling according to claim 1, wherein the radial compressive spring rates of said spherical and second elastomeric bearings are adjustable so as to modify the range of speeds for subcritical and supercritical operation of said coupling.

24. A flexible coupling comprising:
a first torque transmitting member capable of being rotated about a first rotation axis;
a second torque transmitting member capable of being rotated about a second rotation axis; and
connection means for connecting said first and second members so as to (1) tend to maintain said first and second axes aligned with one another and (2) maintain a constant angular velocity of said first member about said first axis when said second member is rotating at a constant angular velocity about said second axis whether said first and second axes are aligned or misaligned;

said connection means comprising (a) a plurality of first connecting members having first and second opposite ends, each of said first connecting members having its first end secured to said first torque transmitting member at a location radially spaced from said first axis and angularly spaced from the other first connecting members about said first axis;

(b) a like plurality of second connecting members having first and second opposite ends, each of said second connecting members having its first end secured to said second torque transmitting member at a location radially spaced from said second axis and angularly spaced from the other second connecting members about said second axis, the second end of each of said second connecting members being adjacent to the second end of a corresponding one of said first connecting members;

(c) a like plurality of first securing means each coupling the second end of one of said first connecting members to the adjacent second end of the corresponding one of said second connecting members, each of said first securing means including spherical bearing means for absorbing compression forces between the second ends of the connecting members which are coupled thereby and having its center of curvature lying in a plane which bisects any angle formed by the intersection of said first and second rotation axes when said first and second torque transmitting members are angularly misaligned;

(d) a like plurality of second securing means for securing the first ends of said first connecting means to said first torque transmitting member, said second securing means including second bearing means between the first end of each of said first connecting members and said first torque transmitting member for carrying compression stress loads therebetween resulting from torque transmission, and for providing shear motion resulting from misalignment; and (e) a like plurality of third securing means for securing the first ends of said second connecting members to said second torque transmitting member; said third securing means including third bearing means between the first end of each of said second connecting members and said second torque transmitting member so as to carry compression stress loads therebetween and for providing shear motion resulting from misalignment.

* * * * *

UNITED STATES PATENT AND TRADEMARK OFFICE
CERTIFICATE OF CORRECTION

PATENT NO. : 4,208,889
DATED : June 24, 1980
INVENTOR(S) : Robert R. Peterson

It is certified that error appears in the above-identified patent and that said Letters Patent are hereby corrected as shown below:

Column 2, line 46: Delete "al" and substitute therefor the word "all"

Column 9, line 47: Delete "interset" and substitute therefor the word "intersect"

Signed and Sealed this

Ninth Day of September 1980

[SEAL]

Attest:

SIDNEY A. DIAMOND

Attesting Officer

Commissioner of Patents and Trademarks